United States Patent [19]

Chikazawa et al.

[11] Patent Number: 5,313,352
[45] Date of Patent: May 17, 1994

[54] MAGNETIC DISK SLIDER HAVING PIEZO-ELECTRIC VIBRATION ELEMENTS

[75] Inventors: Takao Chikazawa, Fujisawa; Akihiko Aoyagi, Yamato; Atsushi Tobari, Fujisawa, all of Japan

[73] Assignee: International Business Machines Corporation, Armonk, N.Y.

[21] Appl. No.: 943,612

[22] Filed: Sep. 11, 1992

[30] Foreign Application Priority Data

Sep. 12, 1991 [JP] Japan .................................. 3-260502

[51] Int. Cl.⁵ .............................................. G11B 5/60
[52] U.S. Cl. .................................................. 360/103
[58] Field of Search ......................................... 360/103

[56] References Cited

U.S. PATENT DOCUMENTS 4,532,802 8/1985 Yeack-Scranton et al. ....... 73/432 R
5,021,906 6/1991 Chang ................................... 360/103

FOREIGN PATENT DOCUMENTS 61-194684 8/1986 Japan .
1-166382 6/1989 Japan .
3-144979 6/1991 Japan .

OTHER PUBLICATIONS

IBM Technical Disclosure Bulletin, vol. 30, No. 8, Jan. 1988, "Flexible Magnetic Head Slider".
Tribology Friction, Lubrication, and Wear, article on "Rectification Effects of High-Frequency Oscillations" by Hemisphere Publishing Corporation.

Primary Examiner—A. J. Heinz
Attorney, Agent, or Firm—Richard E. Billion; Roy W. Truelson

[57] ABSTRACT

In the slider 1 on which a transducer 5 is mounted and which moves above a recording surface 4, in order to generate different vibration modes according to various situations such as vertical lift-off and landing, and breaking away from stiction, etc. A plurality of piezo-electric elements 8A, 8B, 8C, and 8D are disposed on the slider 1 and means for supplying a different AC voltage to each of the piezo-electric elements 8A, 8B, 8C, and 8D is provided.

16 Claims, 6 Drawing Sheets

Neither compressed nor expanded

FIG. 4A

Compressed

FIG. 4B

Expanded

FIG. 4C

Compressed     Neither compressed nor expanded     Expanded FIG. 5A     FIG. 5B     FIG. 5C FIG. 6A     FIG. 6B     FIG. 6C

FIG. 7

Velocity of Rotation of Disk

FIG. 8A

Forces between disk and slider against each other

FIG. 8B

Floating height

FIG. 8C

MAGNETIC DISK SLIDER HAVING PIEZO-ELECTRIC VIBRATION ELEMENTS

BACKGROUND OF THE INVENTION

1. Field of the Invention

The present invention relates to a slider on which a transducer for a disk apparatus, etc. is mounted and which moves relatively above a recording surface, and more particularly, to a slider on which piezo-electric elements are disposed and a disk storage apparatus having the slider.

2. Description of the Prior Art

In a magnetic disk apparatus, a slider with a mounted transducer is raised by a high-speed air flow caused by a disk that rotates at a high speed and data is written or read to or from the recording surface of the disk during relative motion of the transducer and the disk. Such a slider is fixed to a suspension. In order to keep the slider flying at a predetermined height (sub micron) above the recording surface, resilient force urging the slider toward the recording surface against the buoyancy of the high-speed air flow is always applied to the slider by the suspension.

Therefore, if the speed of rotation of the disk decreases and the buoyancy of the high speed air flow becomes no longer enough to support the slider, the slider will run into the recording surface and recorded data will be destroyed. To avoid this, when the disk is at rest or its rotation is not enough for the buoyancy, conventionally, a mechanism for raising and supporting the slider above the recording surface is provided, or the slider is moved into an area (landing zone) not used for recording data on the disk but used for landing or sliding.

The latter method in which the slider retreats to the landing zone at the rest time of the disk and slides on the landing zone when the buoyancy is not enough, is called contact start and stop method (CSS). This method is widely used because it has the advantages of greater simplicity in construction and reduced cost in comparison with the former method in which the slider is raised and supported by a mechanism.

However, in the contact start and stop method, at the time when the disk starts to rotate from its rest state torque requirement, that is, power requirement increases due to friction between the disk and the slider, or if the slider is stuck into lubricant film applied on the landing zone when it is at rest, this phenomenon is called stiction, the slider and the lubricant film may be damaged if the slider is forced to break away the lubricant film. Further, it would be a problem that rubbing of the slider which slides on the landing zone causes dust to be blown up and results in contamination. Still further, when the slider slides on the landing zone, smooth sliding is not actually done so that the slider will collide repeatedly with the surface of the disk many times and the disk and the slider will receive a shock. Therefore, both of them are required to have mechanical strength to some extent.

To solve such problems, prior art makes the air bearing surface (ABS) of the slider contacting the recording surface convex or to fabricate the landing zone rough, that is, fine convexities and recessions are provided on the surface, in order to decrease the area of contact between the slider and the recording surface so far as the extent allows and to reduce friction or stiction.

However, the above method leaves room for discussion in terms of the accuracy of works.

Further, conventionally, it is proposed that piezo-electric elements are mounted on the slider. The piezo-electric elements are used for arbitrarily changing the degree of the evenness of the air bearing surface (ABS) (Japanese Published Unexamined Patent Applications (PUPAs) No. 1-166382 and No. 3-144979) or for making a transducer element projected form the ABS while the slider is flying and making it retreated at the time of slider's landing (Japanese PUPA No. 61-194684).

In which case of Japanese PUPAs No. 1-166382, No 3.-144979, and No. 61-194684, piezo-electric elements are disposed on a slider of contact start and stop type and stiction to a landing zone can be weakened and the floating height can be adjusted by changing the shape of the ABS, but if a disk rotates at less than the rotational velocity enough to support the slider, it would be a problem that sliding occurs between the slider and the disk and results in the increase of torque due to friction and occurrence of contaminating particles due to rubbing.

Further, it is conventionally known that a film of compressed air is formed by vibrating piezo-electric elements at a high frequency, and thereby an object is supported (Refer to Pages 172 to 216 of TRIBOLOGY Friction, Lubrication, and Wear Edited by A.Z.Szeri, Copyright 1980 Hemisphere Publishing Corporation).

Still further, an attempt to dispose one piezo-electric element on the slider of a disk storage apparatus to raise the slider by applying AC voltage to the piezo-electric element was made by W.D.Koperski and G.A.Domoto at Columbia University in New York in 1981.

Construction attempted by Koperski et al is such that high-frequency vibration caused by the piezo-electric element vertically raises and lowers the slider and has the possibility of solving, by one effort, the above problem on sliding between the disk and the slider at the time when the disk rotates at less than the rotational velocity to support the slider.

However, in the construction attempted by Koperski et al, only one piezo-electric element is disposed on the slider, and therefore the number of modes, in which the slider is vibrated by the piezo-electric element, is very restricted and it is scarcely possible to change the vibration mode of the slider according to situation.

For example, when stiction occurs between a slider and a disk, rolling (oscillation around the longitudinal axis of the slider) or pitching (oscillation around the transversal axis of the slider) motion for removing the slider from the disk shows a more effect than even up-and-down motion. In the construction attempted by Koperski et al, however, it is difficult to generate vibration of such various modes in the slider.

Besides, if the slider floats through the high-speed air flow while the disk rotates at an operational velocity, it is difficult for the construction attempted by Koperski et al to apply a controlled AC voltage (for example, of the same or reverse phase, etc.) to each of piezo-electric elements disposed at a plurality of positions of the slider in order to change the floating height and posture of the slider.

SUMMARY OF THE INVENTION

An object of the present invention is to provide a slider which can generate various kinds of vibration mode according to situation.

To accomplish the above object, a slider for moving a transducer above a recording surface according to the present invention is provided with a plurality of piezo-electric elements and means for applying different AC voltages to a plurality of the piezo-electric elements.

According to the above construction of the present invention, if an AC voltage in reverse phase is applied to each of a plurality of the piezo-electric elements disposed on both sides of the slider, transversal oscillation (rolling) of the slider can be made; if an AC voltage in reverse phase is applied to each of a plurality of the piezo-electric elements disposed at the leading and trailing ends of the slider, longitudinal oscillation (pitching) of the slider can be made; and if an AC voltage of the same phase is applied to each of a plurality of the piezo-electric elements disposed on the slider, even up-and-down oscillation of the slider can be made. In the following, a preferred embodiment of the present invention is described by reference to drawings.

BRIEF DESCRIPTION OF THE DRAWINGS

FIG. 2 shows the main part of a slider of the embodiment of the present invention.

FIG. 4 shows the principles of operations of the piezo-electric elements used for the prevent invention.

FIG. 5 shows the vibration of the slider at the time when an AC voltage in the same phase is supplied to each of the piezo-electric elements on the slider shown in FIG. 2.

FIG. 6 shows the vibration of the slider at the time when an AC voltage in reverse phase is supplied to each of the piezo-electric elements at the leading and the trailing ends on the slider shown in FIG. 2.

FIG. 8 shows the operations of a magnetic disk apparatus using the vertical lift-off-and-landing type of slider in accordance with the present invention, in comparison with those of a magnetic disk apparatus using the conventional contact start-and-stop type of slider.

DETAILED DESCRIPTION OF THE PREFERRED EMBODIMENT

FIG. 1 to FIG. 8 shows a preferred embodiment of the present invention. At first, the embodiment is described by reference to FIG. 1 and FIG. 2. A slider 1 has an air bearing surface (ABS) 2 and an opposite back surface 3 of the ABS 2. The ABS 2 faces a disk surface, that is, a recording surface 4. Provided at the leading edge of the ABS 2 in relative movement due to the rotation of a magnetic disk is a slanting surface 2A through which a high-speed air flow gets into a gap between the ABS 2 and the disk surface 4 while the disk rotates so that buoyant force is applied to the slider. On the other hand, provided at the trailing edge is a gap 5B of a magnetic circuit 5A formed in a transducer 5 through which magnetized data is read from the disk surface 4 or data is written to the disk surface 4. Attached to the back surface 3 of the slider 1 is one end of a suspension 6, the other end of which is mounted on an actuator arm 7. The actuator arm 7 supports the slider 1 and moves it across the disk surface 4 in the radial direction of the disk to position the gap 5B to a predetermined track on the surface 4. The suspension 6 exerts resilient force on the slider 1 against the buoyancy of a high-speed air flow so that the slider is urged toward the disk surface 4 and thereby the gap 5B of the transducer 5 on the slider 1 flies over the disk surface 4 at a predetermined height.

Figure 1:
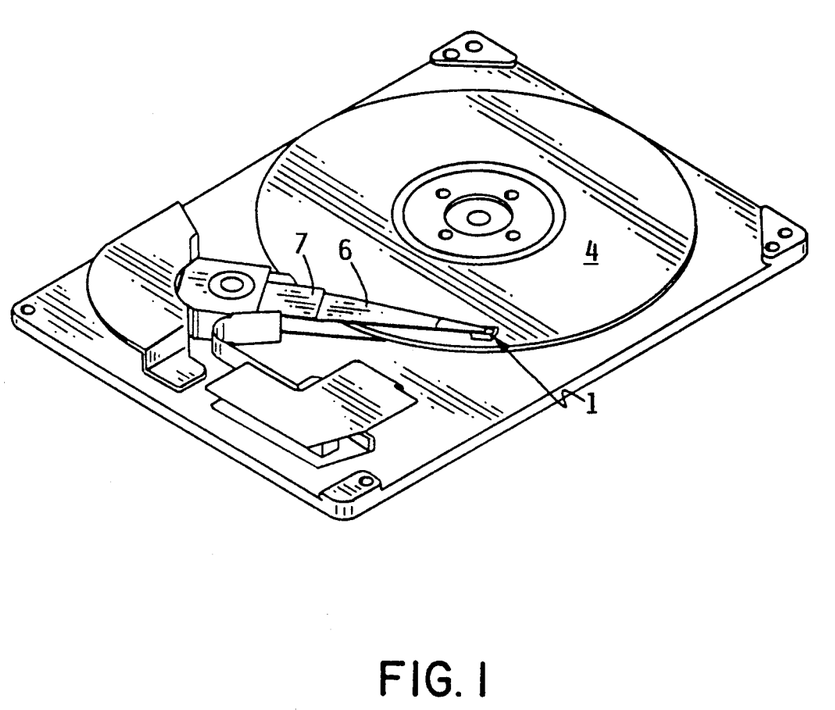
FIG. 1 is a perspective view showing an embodiment of a disk apparatus constructed in accordance with the present invention.
Figure 2A:
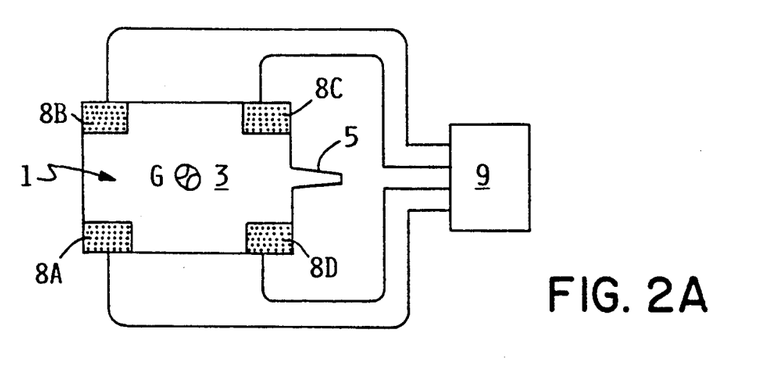
FIG. 2(a) is a top view of the slider in which means for supplying AC voltages is shown.
Figure 2B:
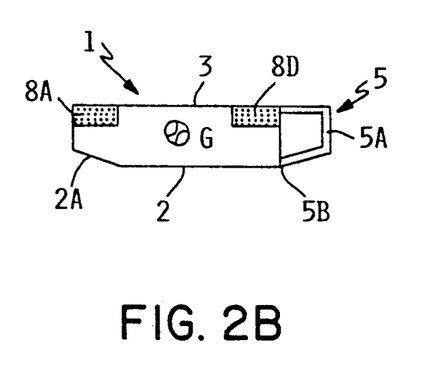
FIG. 2(b) is a plan view of the slider.
Figure 2C:
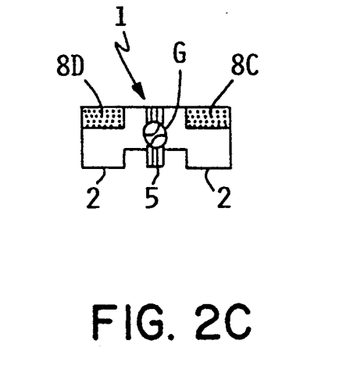
FIG. 2(c) is a right side view of the slider.
Figure 3:
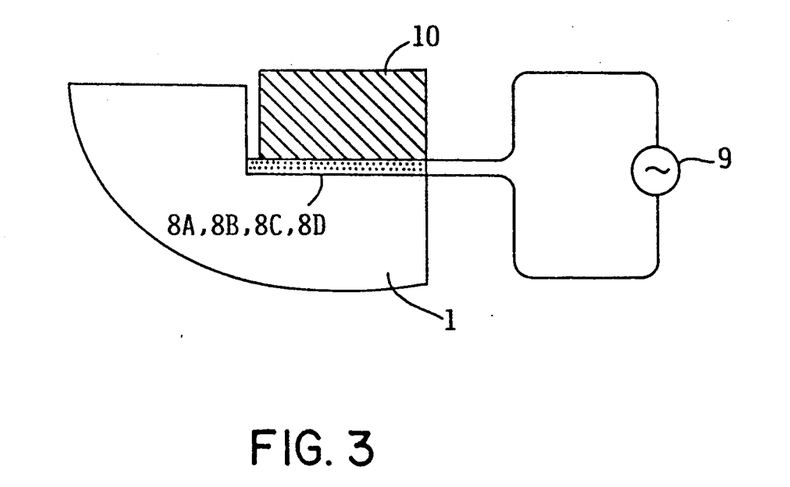
FIG. 3 is a partially enlarged cross-sectional view showing how piezo-electric elements are mounted on the slider.

As shown in FIG. 2, disposed in four corners at the leading and the trailing edges on the back surface 3 of the slider 1 are piezo-electric elements 8A, 8B, 8C, and 8D, respectively. The piezo-electric elements 8A, 8B, 8C, and 8D are symmetrically positioned to the slider 1 with respect to the center of gravity G of the slider 1 and the piezo-electric elements 8A, 8B, 8C, and 8D are of the same size. The piezo-electric elements 8A, 8B, 8C, and 8D may be mounted on the slider 1 by sticking each block of the piezo-electric elements on the slider 1, or may be disposed, by spattering, in the slider 1. Connected to the piezo-electric elements 8A, 8B, 8C, and 8D is means 9 for applying a controlled AC voltage to each of them. As shown in FIG. 3, on the piezo-electric elements 8A, 8B, 8C, and 8D mounted on the slider 1, a weighty object 10 may be mounted. The object 10 makes the slider 1 vibrate largely according to the motions of the piezo-electric elements 8A, 8B, 8C, and 8D.

Figure 4A:
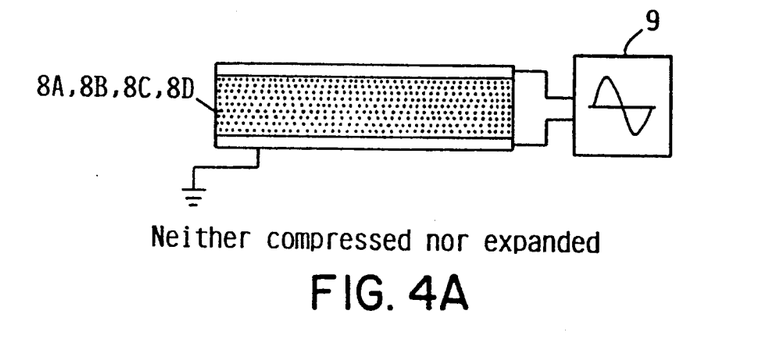
FIG. 4(a) shows a usual state where there is no supply of AC voltage.
Figure 4B:
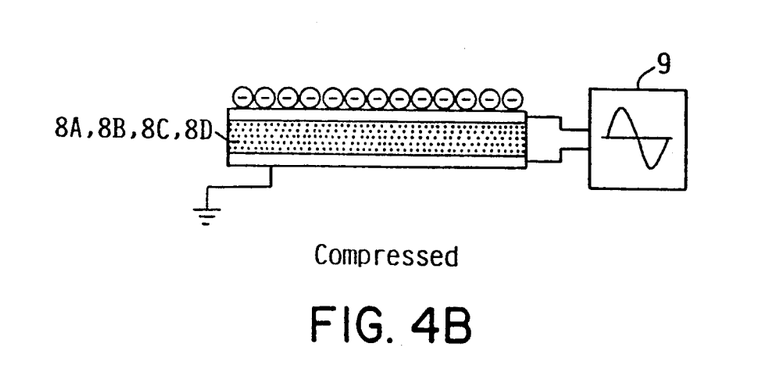
FIG. 4(b) shows a state where the piezo-electric elements are compressed by the supply of AC voltage.
Figure 4C:
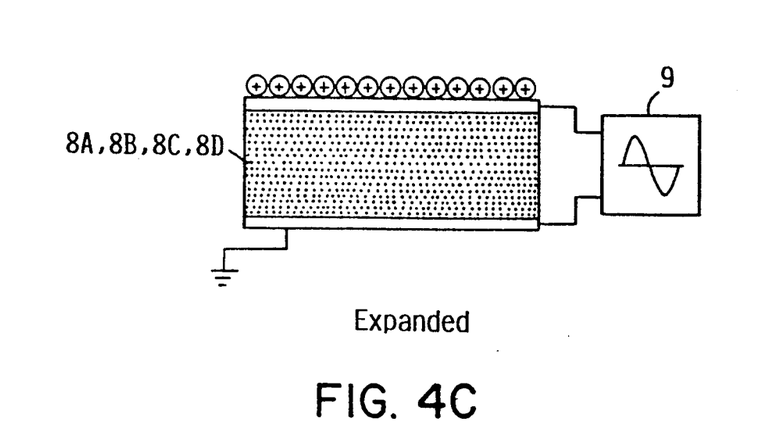
FIG. 4(c) shows a state where the piezo-electric elements are expanded by the supply of AC voltage.

As shown in FIG. 4, each of the piezo-electric elements 8A, 8B, 8C, and 8D has the property that it will expand or contract when a positive or a negative voltage is applied to its both ends.

Figure 5A:
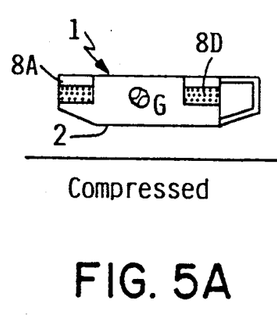
FIG. 5(a) shows a state where the piezo-electric elements are compressed all together.
Figure 5B:
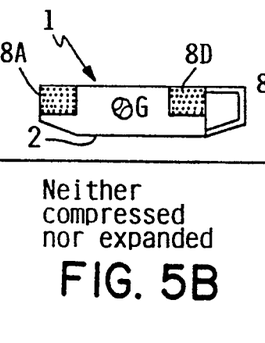
FIG. 5(b) shows an usual state where piezo-electric elements are neither compressed nor expanded.
Figure 5C:
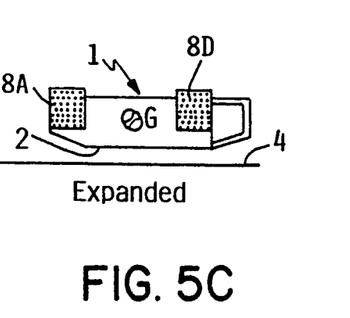
FIG. 5(c) shows a state where the piezo-electric elements are expanded all together.

As shown in FIG. 5, when an AC voltage in the same phase is applied to each of the piezo-electric elements 8A, 8B, 8C, and 8D mounted on the slider 1, it will contract and expand repeatedly in the same phase. When the piezo-electric elements 8A, 8B, 8C, and 8D contract or expand, the slider 1 vibrates up and down in a horizontal posture at the state where the center of gravity G is maintained by a reaction of contraction or expansion.

Thereby a film of compressed air is formed between the ABS 2 and the disk surface 4 and the slider 1 can float, through the air film, over the surface 4 of the disk at rest.

Figure 6A:
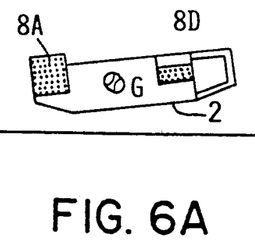
FIG. 6(a) shows a state where the leading and the trailing piezo-electric elements are expanded and compressed, respectively.
Figure 6B:
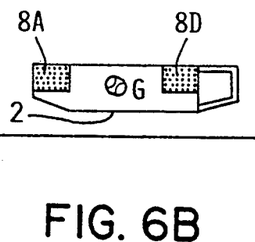
FIG. 6(b) shows a usual state where the piezo-electric elements are neither expanded nor compressed.
Figure 6C:
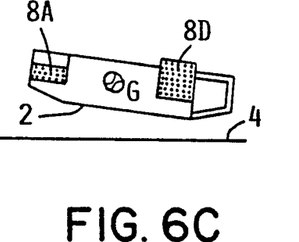
FIG. 6(c) shows a state where the leading and the trailing piezo-electric elements are compressed and expanded, respectively.

If the slider 1 is at rest on the disk surface 4 for a long time, and thereby stiction occurs between the slider 1 and the disk surface 4, it may be difficult that by only the even up-and-down motion described above the slider 1 is broken away from the disk surface 4. To overcome such difficulty, as shown in FIG. 6, it is preferable that AC voltages in opposite phase are applied to the piezo-electric elements 8A and 8B mounted on the leading edge of the slider 1 and the piezo-electric elements 8C and 8D mounted on its trailing edge so that longitudinal oscillation (pitching) is made, and thereby the slider 1 can readily separate from the disk surface which is causing stiction.

Figure 7:
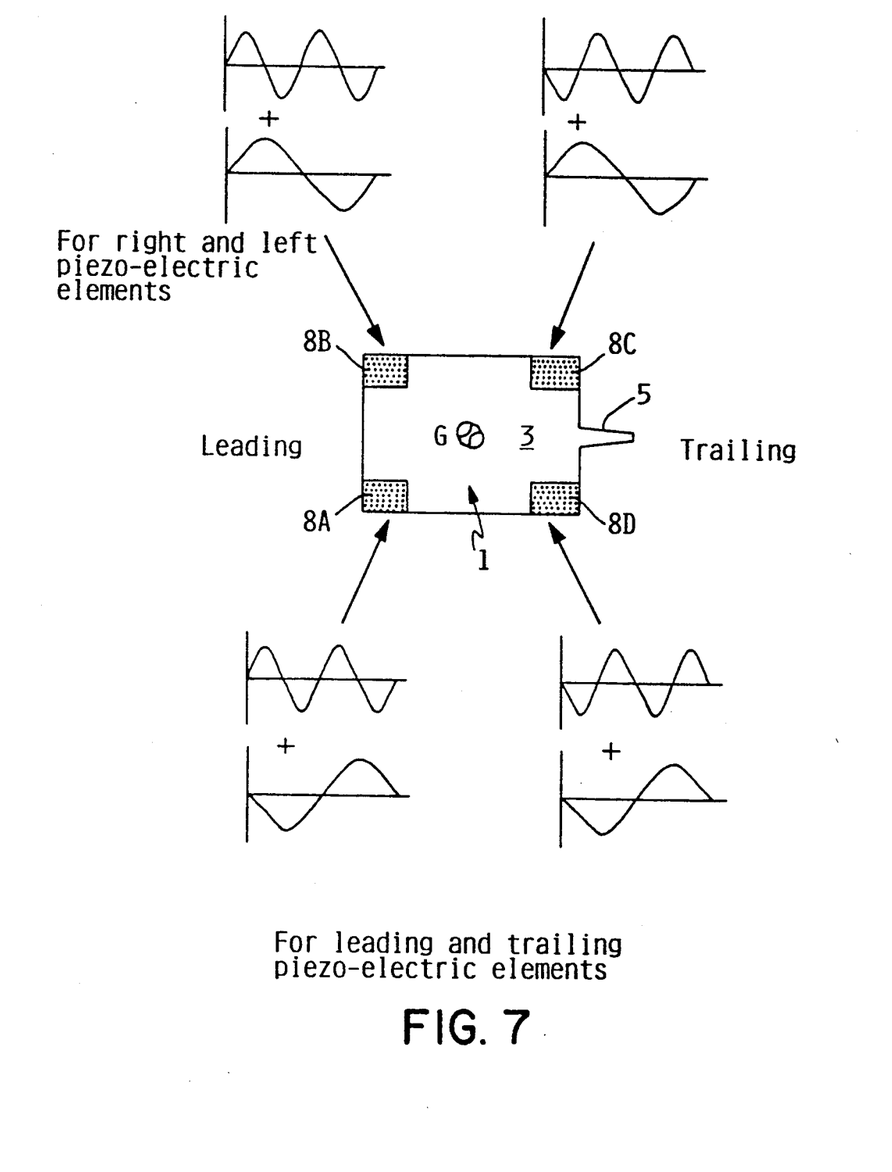
FIG. 7 shows that two AC voltages which are different in phase, in amplitude and in frequency are supplied to each of the piezo-electric elements on the slider shown in FIG. 2.

It is easily understood that if AC voltages in reverse phase are applied to the piezo-electric elements 8A and 8D on one side of the slider 1 and the piezo-electric elements 8B and 8C on the other side of the slider 1, transversal oscillation (rolling) is made, and thereby the slider 1 can separate, similarly, from the disk surface which is causing stiction. AC voltages which are applied to the piezo-electric elements 8A, 8B, 8C, and 8D can be controlled so that pitching and rolling are synthesized. That is, AC voltages represented by sign waves which differ in phase by quarter can be applied to the piezo-electric elements 8A, 8B, 8C, and 8D in this order. Naturally, according to situation, the amplitudes and frequencies of AC voltages may be controlled for each of the piezo-electric elements 8A, 8B, 8C, and 8D. Further, as shown in FIG. 7, two AC voltages which make pitching and rolling to the piezo-electric elements 8A, 8B, 8C, and 8D may be superimposed with each other. The amplitude and frequency of each AC voltage differs according to the characteristic of pitching or rolling.

Figure 8A:
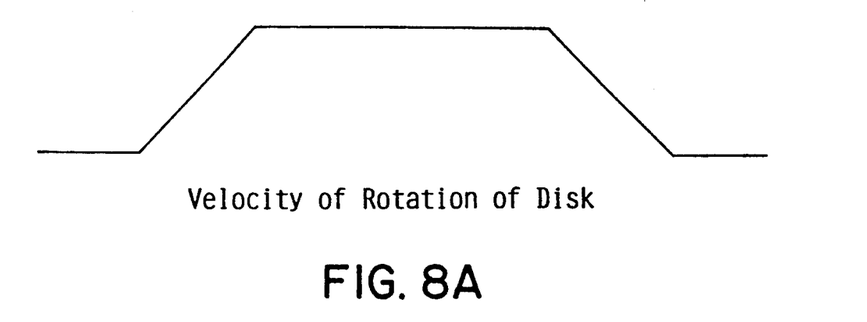
FIG. 8(a) shows the velocity of rotation of the magnetic disk apparatus.
Figure 8B:
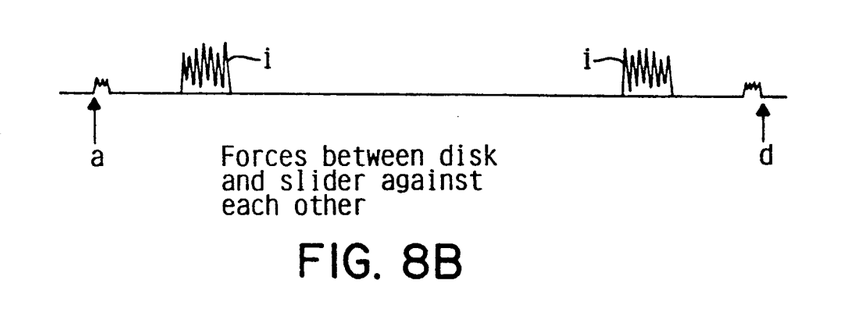
FIG. 8(b) shows forces between the magnetic disk and the slider against each other.
Figure 8C:
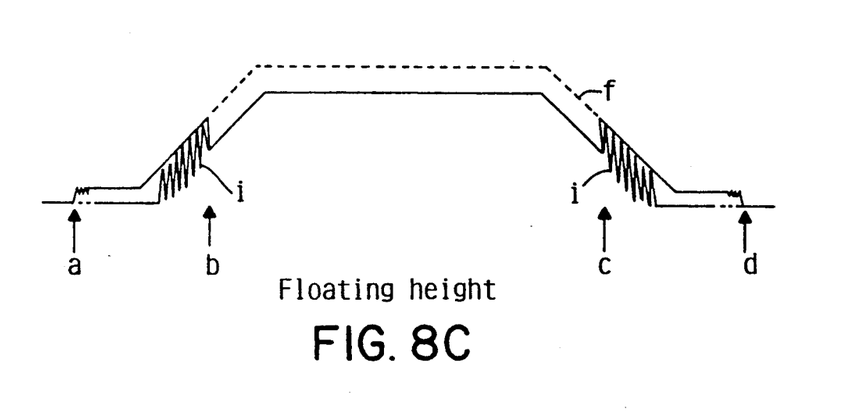
FIG. 8(c) shows the floating height of the slider.

FIG. 8 shows vertical-lift-off and vertical-landing motions of the slider 1 with respect to the magnetic disk by means of the piezo-electric elements 8A, 8B, 8C, and 8D. FIG. 8(a), FIG. 8(b), and FIG. 8(c) show the velocity of rotation of the magnetic disk, forces applied to the magnetic disk and the slider against each other, and the floating height of the slider from the disk surface, respectively. The measurement of the contact start and stop method of the prior art is shown by chain lines i.

At the time before the magnetic disk rotates, the slider 1 is vertically lifted off by supplying AC voltages to the piezo-electric elements. In this case, first AC voltages in reverse phase may be supplied to separate the slider 1 from the disk which is causing stiction and then AC voltages in the same phase may be supplied. At the time when the rotation of the magnetic disk increases, the AC voltages supplied to the piezo-electric elements 8A, 8B, 8C, and 8D are switched off and floating is started only by a high-speed air flow. At the time when the rotation of the magnetic disk decreases, AC voltages of the same phase are supplied to the piezo-electric elements 8A, 8B, 8C, and 8D to add floating due to the vibration of the slider 1. At the time when the disk stops rotating, the AC voltages are switched off to vertically land the slider 1 on the disk surface.

The lift-off and landing, thus obtained, of the slider in the vertical direction has, when comparing with the conventional contact start and stop method, the advantages of freedom from friction due to sliding between the magnetic disk and the slider at the time when the magnetic disk rotates at less than rotational velocity enough to fly the slider and less shock due to the collision of the magnetic disk with the slider.

Further, as indicated by dotted lines f in FIG. 8(c), if the piezo-electric elements 8A, 8B, 8C and 8D on the slider 1 remain applied AC voltages of the same phase, the floating height of the slider 1 can be held greater. The higher floating can be used when high reliability is required to prevent head crush. When the AC voltages are switched off, as indicated by a solid line in FIG. 8(c), only floating due to an air flow occurs and a S/N ratio is improved although the floating height will decrease.

Described hitherto is the embodiment of the vertical lift-off-and-landing type of slider. However, it will be appreciated that the embodiment of the present invention may be applied also to the contact start-and-stop type of slider. In this case, as shown in FIG. 2, the piezo-electric elements 8A, 8B, 8C, and 8D are mounted on the contact start-and-stop type of slider and AC voltages are applied to vibrate and separate the slider from the disk which is causing stiction.

Advantages gained according to the present invention are as follows:

The slider may vibrate, according to situation, in variable types of vibration mode. The slider may easily separate from the disk surface even though stiction occurs. The flying height and posture of the slider may be controlled. Since there is no sliding between the disk surface and the slider, torque for driving the disk will not be increased and contamination may be prevented. Less friction between the slider and the disk against each other or less collision of the slider with the disk causes the lubricant film or the overcoat on the disk surface to be thinned down, thus a distance between a gap of the transducer and the recording surface may be decreased to make the recording density higher.

What is claimed and desired to be secured by Letters Patent of the United States is:

1. A slider for moving a transducer above a recording surface comprising:
   a leading edge;
   a trailing edge;
   a first side;
   a second side;
   a plurality of piezo-electric elements disposed on said slider; and
   means for supplying AC voltages to a plurality of the piezo-electric elements to induce vibration of said slider.

2. The slider according to claim 1, wherein said means for supplying voltages supplies AC voltages of different frequency to said plurality of piezo-electric elements.

3. The slider according to claim 1, wherein said means for supplying voltages supplies AC voltages of different phase to said plurality of piezo-electric elements.

4. The slider according to claim 1, wherein at least one of said piezo-electric elements is disposed near the leading edge of said slider, and at least one of said piezo-electric elements is disposed near the trailing edge of said slider.

5. The slider according to claim 1, wherein at least one of said piezo-electric elements is disposed near said first side of said slider, and at least one of said piezo-electric elements is disposed near said second side of said slider.

6. The slider according to claim 5, wherein at least one of said piezo-electric elements is disposed near the leading edge of said slider, and at least one of said piezo-electric elements is disposed near the trailing edge of said slider.

7. The slider according to claim 1, wherein said slider includes a rectangular surface defined by said leading edge, said trailing edge, said first side, and said second side, wherein at least one of said piezo-electric elements is located near the corners of the rectangular surface of the slider.

8. A disk storage apparatus comprising:
 a rotatable disk having a recording surface;
 a transducer for writing or reading data to or from said recording surface;
 a slider which moves over the said recording surface of said disk, said slider having said transducer attached thereto;
 a plurality of piezo-electric elements which are disposed on said slider; and
 means for supplying AC voltages to a plurality of the piezo-electric elements to induce vibration of said slider.

9. The disk storage apparatus according to claim 8, wherein said means for supplying said voltages supplies AC voltages of different frequency to a plurality of said piezo-electric elements.

10. The disk storage apparatus according to claim 8, wherein said means for supplying said voltages supplies AC voltages in different phase to a plurality of said piezo-electric elements.

11. A method for changing the attitude of a slider in a disk storage apparatus where the slider has a leading edge, a trailing edge, a first side, and a second side, said method comprising the steps of:

attaching at least one piezo-electric element, which changes shape in response to a voltage being applied to the piezo-electric element, to the slider; and applying an AC voltage to the piezo-electric element to change its shape and move the center of gravity of the slider.

12. The method of claim 11 wherein the attaching step further comprises attaching at least two piezo-electric elements to said slider, and wherein the step of applying a voltage further includes applying a voltage to at least two piezo-electric elements.

13. The method of claim 12 wherein the step of applying voltage to the piezo-electric elements further comprises applying an AC voltage having substantially the same frequency and phase to each of said piezo-electric elements.

14. The method of claim 12 wherein the step of applying voltage to the piezo-electric elements further comprises applying an AC voltage having substantially the same frequency and a different phase to each of said piezo-electric elements.

15. The method of claim 12 wherein the frequency of the AC voltage applied to one piezo-electric element has a first AC frequency component and a second AC component and the frequency applied to the other piezo-electric element has a third frequency component and a fourth frequency component.

16. The method of claim 15 wherein one of the first and second AC components is equal to one of the third and fourth AC components and out of phase.

* * * * *